US012717594B2

(12) United States Patent
Lee

(10) Patent No.: US 12,717,594 B2
(45) Date of Patent: Aug. 25, 2026

(54) MULTIMEDIA DEVICE AND CONTROL METHOD THEREFOR

(71) Applicant: LG ELECTRONICS INC., Seoul (KR)

(72) Inventor: Dongyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 129 days.

(21) Appl. No.: 18/529,158

(22) Filed: Dec. 5, 2023

(65) Prior Publication Data

US 2025/0077246 A1 Mar. 6, 2025

(30) Foreign Application Priority Data

Sep. 1, 2023 (KR) ........................ 10-2023-0116181

(51) Int. Cl.

*G06F 9/451* (2018.01)
*G06F 3/00* (2006.01)
*H04N 21/442* (2011.01)
*H04N 21/472* (2011.01)

(52) U.S. Cl.

CPC .............. *G06F 9/451* (2018.02); *G06F 3/005* (2013.01); *H04N 21/44218* (2013.01); *H04N 21/47217* (2013.01)

(58) Field of Classification Search

CPC ... G06F 9/451; G06F 3/005; H04N 21/44218; H04N 21/47217

See application file for complete search history.

(56) References Cited

U.S. PATENT DOCUMENTS 10,571,991 B2 * 2/2020 Sprenger ............ H04N 21/4532
11,991,418 B1 * 5/2024 McCarty .......... H04N 21/47217
2010/0303296 A1 * 12/2010 Hattori ............ H04N 21/23418 382/103
2011/0018717 A1 * 1/2011 Takahashi ........... A01K 29/005 340/573.1
2013/0209073 A1 * 8/2013 Carvajal .............. G11B 31/003 386/344
2013/0318547 A1 * 11/2013 Stavrou ............ H04N 21/44218 725/12

(Continued)

FOREIGN PATENT DOCUMENTS

KR 10-2012-0009748 2/2012
KR 10-2016-0010250 1/2016

(Continued)

OTHER PUBLICATIONS

European Patent Office Application Serial No. 23213989.9, Search Report dated May 6, 2024, 6 pages.

(Continued)

*Primary Examiner* — Nicholas Augustine

(74) *Attorney, Agent, or Firm* — LEE, HONG, DEGERMAN, KANG & WAIMEY

(57) ABSTRACT

Disclosed herein is a multimedia device. The multimedia device includes: a display configured to display a user interface based on a pet care mode; and a controller configured to control the display. The controller is configured to: detect whether trigger conditions are satisfied, wherein the trigger conditions include selection by a user or absence of the user; and activate the pet care mode based on satisfaction of the trigger conditions.

12 Claims, 7 Drawing Sheets

(56) References Cited

U.S. PATENT DOCUMENTS

| | | | | |
|---|---|---|---|---|
| 2016/0057395 | A1* | 2/2016 | Yuki | G06V 40/10 348/222.1 |
| 2019/0281331 | A1* | 9/2019 | Tang | H04W 4/80 |
| 2019/0289360 | A1* | 9/2019 | Choi | H04N 21/44 |
| 2019/0377932 | A1* | 12/2019 | Alameh | H04N 21/4661 |
| 2023/0209132 | A1* | 6/2023 | Woodruff | H04N 21/44218 725/11 |
| 2024/0004923 | A1* | 1/2024 | Chanda | G06F 16/5866 |

FOREIGN PATENT DOCUMENTS

| | | | | |
|---|---|---|---|---|
| KR | 20160021363 | * | 2/2016 | G06Q 50/10 |
| KR | 10-2016-0029552 | | 3/2016 | |
| KR | 10-2016-0084059 | | 7/2016 | |

OTHER PUBLICATIONS

Korean Intellectual Property Office Application No. 10-2023-0116181, Notice of Allowance dated Feb. 28, 2025, 2 pages.

* cited by examiner

Figure 4:
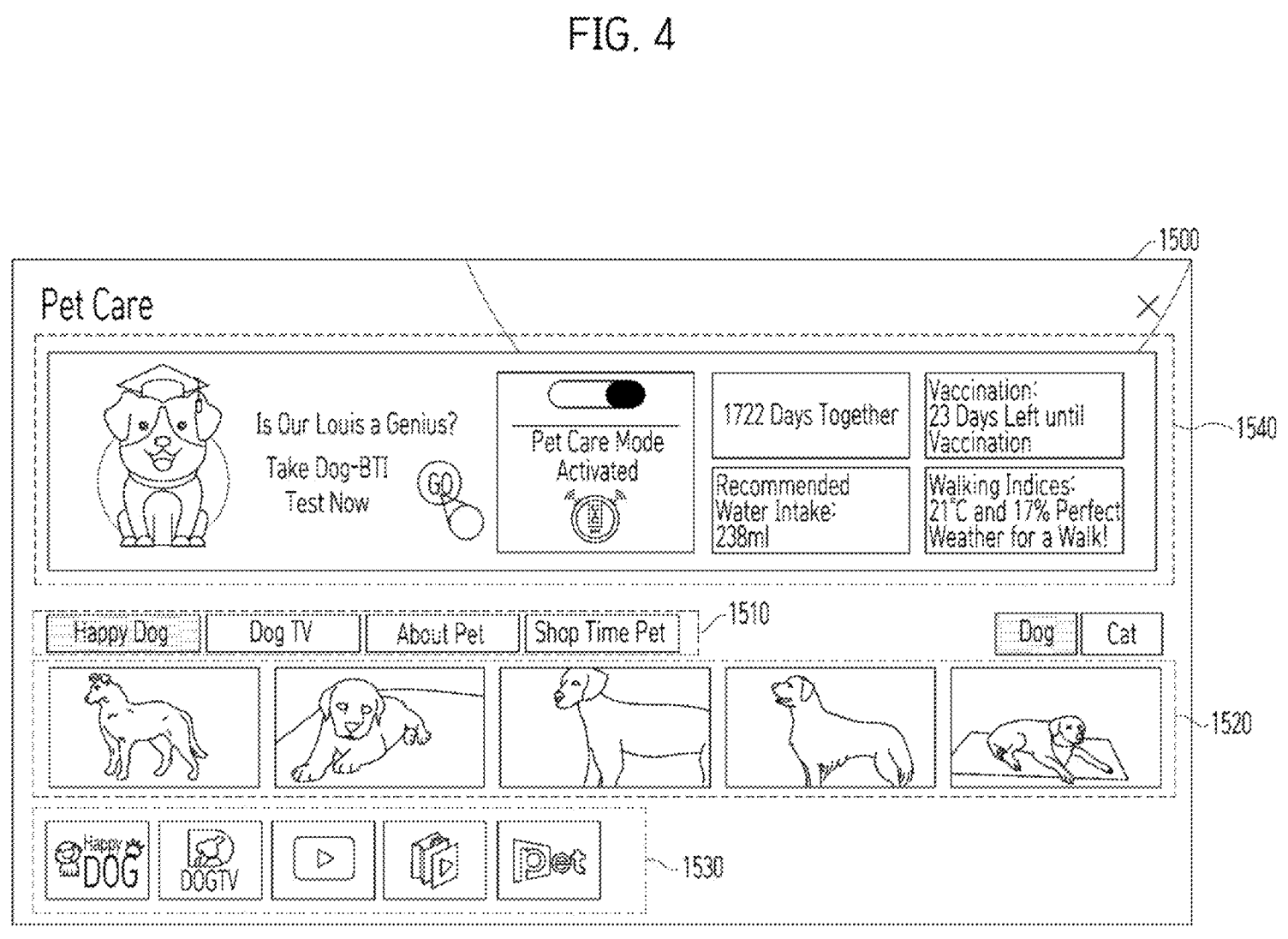

Pet Care

Is Our Louis a Genius?
Take Dog-BTI
Test Now
GO

Pet Care Mode
Activated

1722 Days Together

Vaccination:
23 Days Left until
Vaccination

Recommended
Water Intake:
238ml

Walking Indices:
21°C and 17% Perfect
Weather for a Walk!

Happy Dog
Dog TV
About Pet
Shop Time Pet

Dog
Cat

Happy DOG
DOGTV
Pet

FIG. 6

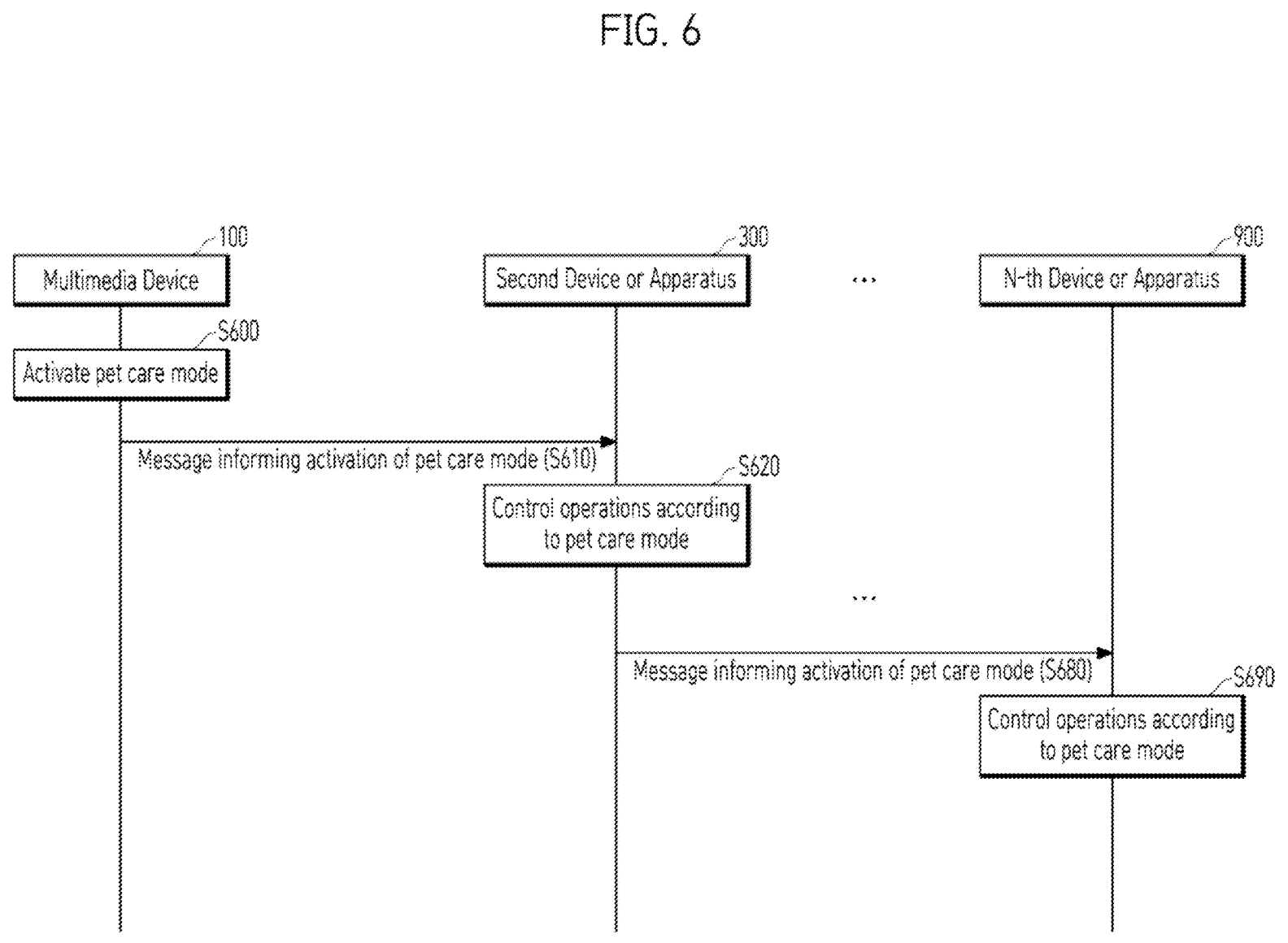

Multimedia Device
100
Activate pet care mode
S600
Message informing activation of pet care mode (S610)
Second Device or Apparatus
300
Control operations according to pet care mode
S620
...
Message informing activation of pet care mode (S680)
...
N-th Device or Apparatus
900
Control operations according to pet care mode
S690

MULTIMEDIA DEVICE AND CONTROL METHOD THEREFOR

CROSS-REFERENCE TO RELATED APPLICATIONS

Pursuant to 35 U.S.C. § 119 (a), this application claims the benefit of earlier filing date and right of priority to Korean Patent Application No. 10-2023-0116181, filed on Sep. 1, 2023, the contents of which are all hereby incorporated by reference herein in their entireties.

BACKGROUND

Technical Field

The present disclosure relates to a multimedia device and control method therefor, and more particularly, to a multimedia device supporting a pet care mode and control method therefor.

Discussion of the Related Art

Recently, in multimedia devices such as a mobile phone and a television (TV), a new form-factor is being discussed. The form-factor refers to a structured form of a product.

The reason why form-factor innovation is emerging as important in a display industry is because of increasing needs of a user for the form-factor that may be used freely and conveniently regardless of a use situation departing from a typical form-factor customized for a specific use environment in the past, resulted from an increase in consumer mobility, convergence between devices, a rapid progress in smartization, and the like.

For example, vertical TVs are expanding, breaking the stereotype that the TVs are viewed horizontally. The vertical TV is a product that allows the user to change a direction of a screen by reflecting characteristics of the Millennials and Gen Z who are accustomed to enjoying content on mobile. The vertical TVs are convenient because a social media or a shopping site image may be viewed easily, and comments may be read while watching videos at the same time. In particular, the advantages of the vertical TV are magnified more when the vertical TV is in association with a smartphone via a near-field communication (NFC)-based mirroring function. When watching regular TV programs or movies, the TV may be switched horizontally.

As another example, a rollable TV and a foldable smartphone are similar to each other in that they both use 'flexible displays'. The flexible display literally means a flexible electronic device. To be flexible, the flexible display must first be thin. A substrate that receives information and converts the same into light must be thin and flexible so that a performance lasts for a long time without damage.

Being flexible means that the flexible display should not be greatly affected even when an impact is applied thereto. While the flexible display is bent or folded, a pressure is continuously applied to a junction. It is necessary to have excellent durability such that the inside is not damaged by such pressure, but also have a property of being easily deformed when the pressure is applied.

The flexible display is implemented based on an organic light-emitting diode (OLED), for example. The OLED is a display using an organic light emitting material. The organic material is relatively more flexible than an inorganic material such as a metal. Furthermore, the OLED has a thin substrate and thus is more competitive than other displays. In a case of an LCD substrate used in the past, there is a limit to reducing a thickness because liquid crystal and glass are required separately.

Finally, as a new form-factor for the TV, a demand for a TV that may be easily moved indoors, and outdoors is increasing. In particular, because of the recent corona virus epidemic, the time the users stay at home is increasing, and thus, a demand for a second TV is increasing. In addition, because of an increase in population going out for camping or the like, there is a demand for the TV of the new form-factor that may be easily carried and moved.

FIG. 2 illustrates an exemplary TV with a new form factor.

The emergence of TVs in various form factors is to improve the user experience, which is intended to provide satisfaction in uninterrupted content consumption and content sharing with others within the home (specific space).

Recently, with an increase in single-person households and households that raise pets, the amount of time spent with pets alone at home has increased. Thus, pet owners have made efforts, such as using smart cameras to monitor the real-time conditions of their pets within their homes.

In these environments, it is expected that there will be a need for methods of providing multimedia content for household pets.

SUMMARY

Accordingly, the present disclosure is directed to a multimedia device and control method therefor that substantially obviates one or more problems due to limitations and disadvantages of the related art.

An object of the present disclosure is to provide a multimedia device supporting a pet care mode and control method therefor.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these objects and other advantages and in accordance with the purpose of the disclosure, as embodied and broadly described herein, there is provided a multimedia device. The multimedia device includes: a display configured to display a user interface based on a pet care mode; and a controller configured to control the display, wherein the controller is configured to: detect whether trigger conditions are satisfied, wherein the trigger conditions include selection by a user or absence of the user; and activate the pet care mode based on satisfaction of the trigger conditions.

In another aspect of the present disclosure, there is provided a method of controlling a multimedia device. The method is performed by a multimedia device including: a display configured to display a user interface based on a pet care mode; and a controller configured to control the display. The method includes: detecting whether trigger conditions are satisfied, wherein the trigger conditions include selection by a user or absence of the user; and activating the pet care mode based on satisfaction of the trigger conditions.

It will be understood by those skilled in the art that the above-described aspects of the present disclosure are merely part of various embodiments of the present disclosure, and various modifications and alternatives could be developed from the following technical features of the present disclosure.

The present disclosure has the following effects.

According to the present disclosure, a multimedia device may support a pet (companion animal) care mode.

According to the present disclosure, a multimedia device for pets that detects the pet's condition and display suitable content on a display may be provided.

The effects that are achievable by the present disclosure are not limited to what has been particularly described hereinabove and other advantages not described herein will be more clearly understood by persons skilled in the art from the following description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 4 illustrates another exemplary user interface 1500 for the pet care mode displayed on the display according to the present disclosure;

FIG. 6 is a flowchart for explaining interaction between the multimedia device for the pet care mode and another device or machine according to the present disclosure.

DETAILED DESCRIPTION

Figure 1:
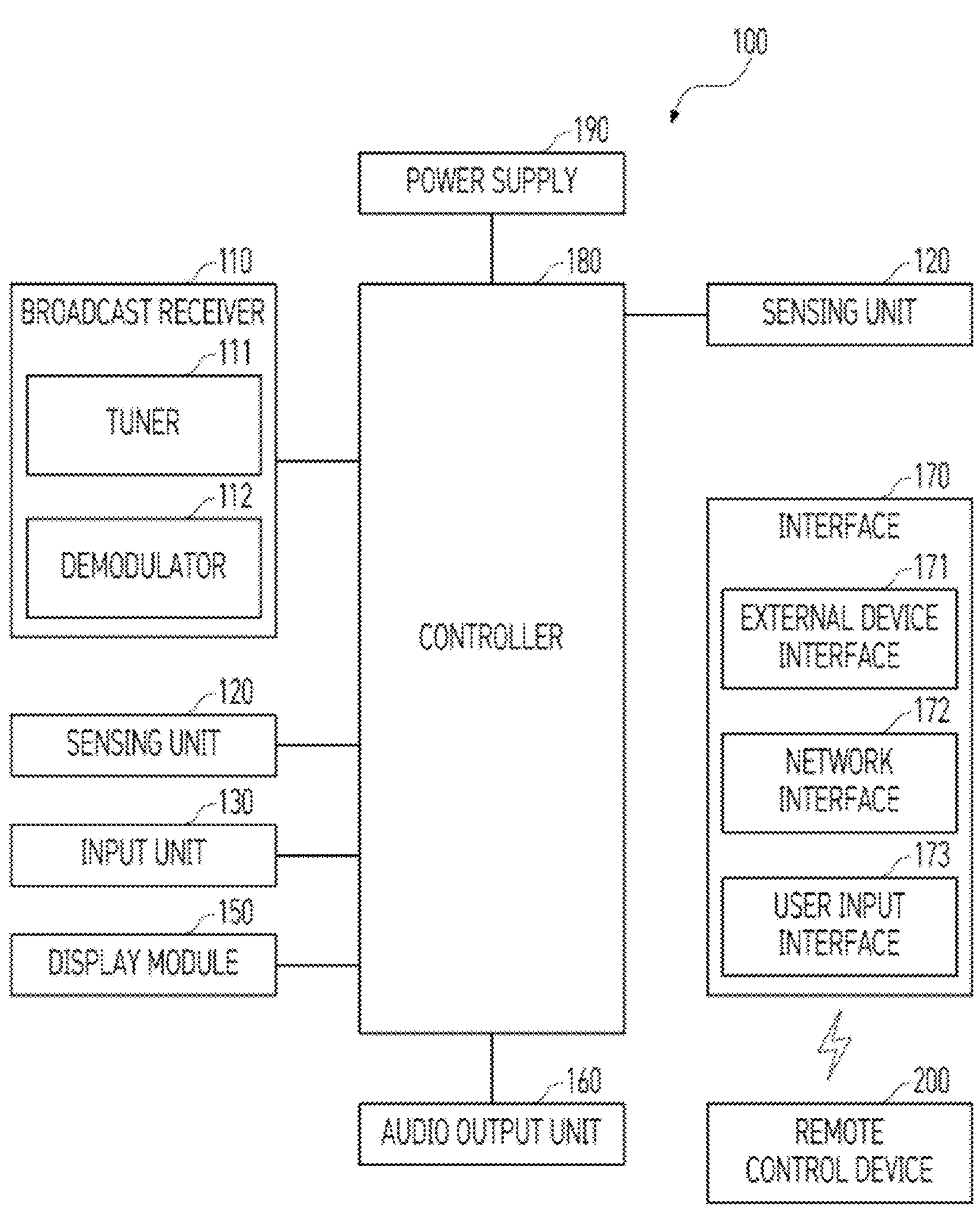
FIG. 1 is a block diagram for explaining each component of a display device.

Reference will now be made in detail to the preferred embodiments of the present disclosure, examples of which are illustrated in the accompanying drawings. Wherever possible, the same reference numbers will be used throughout the drawings to refer to the same or like parts.

Hereinafter, the embodiments disclosed herein will be described in detail with reference to the accompanying drawings, but components that are the same as or similar to each other regardless of reference numerals will be given the same reference numerals, and redundant description thereof will be omitted. The suffixes "module" and "unit" for components used in the following description are given or used together in consideration of case of writing the present document, and do not have meanings or roles that are distinct from each other by themselves. Further, in describing the embodiments disclosed herein, when it is determined that a detailed description of related known technologies may unnecessarily obscure the gist of the embodiments disclosed herein, detailed description thereof will be omitted. In addition, the attached drawings are provided for easy understanding of the embodiments disclosed herein and do not limit technical idea disclosed herein, and should be construed as including all modifications, equivalents, and alternatives falling within the spirit and scope of the present disclosure.

Although terms including ordinal numbers, such as first, second, and the like, may be used to describe various components, the components may not be limited by the terms. The terms are only used to distinguish one component from another.

It should be understood that when a component is referred to as being "connected with" another component, the component may be directly connected with another component or an intervening component may also be present. In contrast, it should be understood that when a component is referred to as being "directly connected with" another component, there is no intervening component present.

A singular representation may include a plural representation unless it represents a definitely different meaning from the context.

The terms "includes" or "has" used herein should be understood as not precluding possibility of existence or addition of one or more other characteristics, figures, steps, operations, constituents, components, or combinations thereof.

In the following descriptions, the term "display device" will be used. However, the term "display device" may refer to various devices such as TVs, multimedia devices, and so on, and thus, the scope of the present disclosure is not limited to specific terminology.

FIG. 1 is a block diagram for illustrating each component of a display device 100 according to an embodiment of the present disclosure.

The display device 100 may include a broadcast receiver 1210, an external device interface 171, a network interface 172, storage 140, a user input interface 173, an input unit 130, and a controller 180, a display module 150, an audio output unit 160, and/or a power supply 190.

The broadcast receiver 1210 may include a tuner 1211 and a demodulator 1212.

Unlike the drawing, the display device 100 may include only the external device interface 171 and the network interface 172 among the broadcast receiver 1210, the external device interface 171, and the network interface 172. That is, the display device 100 may not include the broadcast receiver 1210.

The tuner 1211 may select a broadcast signal corresponding to a channel selected by the user or all pre-stored channels among broadcast signals received via an antenna (not shown) or a cable (not shown). The tuner 1211 may convert the selected broadcast signal into an intermediate-frequency signal or a base band image or audio signal.

For example, when the selected broadcast signal is a digital broadcast signal, the tuner 1211 may convert the digital broadcast signal into a digital IF signal (DIF), and when the selected broadcast signal is an analog broadcast signal, the tuner 1211 may convert the analog broadcast signal into an analog base band image or audio signal (CVBS/SIF). That is, the tuner 1211 may process the digital broadcast signal or the analog broadcast signal. The analog base band image or audio signal (CVBS/SIF) output from the tuner 1211 may be directly input to the controller 180.

In one example, the tuner 1211 may sequentially select broadcast signals of all stored broadcast channels via a channel memory function among the received broadcast signals and convert the selected signals into the intermediate-frequency signal or the base band image or audio signal.

In one example, the tuner 1211 may include a plurality of tuners to receive broadcast signals of a plurality of channels.

Alternatively, the tuner 1211 may be a single tuner that simultaneously receives the broadcast signals of the plurality of channels.

The demodulator 1212 may receive the digital IF signal (DIF) converted by the tuner 1211 and perform a demodulation operation. The demodulator 1212 may output a stream signal (TS) after performing demodulation and channel decoding. In this regard, the stream signal may be a signal in which an image signal, an audio signal, or a data signal is multiplexed.

The stream signal output from the demodulator 1212 may be input to the controller 180. The controller 180 may output an image via the display module 150 and output an audio via the audio output unit 160 after performing demultiplexing, image/audio signal processing, and the like.

A sensing unit 120 refers to a device that senses a change in the display device 100 or an external change. For example, the sensing unit 120 may include at least one of a proximity sensor, an illumination sensor, a touch sensor, an infrared (IR) sensor, an ultrasonic sensor, an optical sensor (e.g., a camera), a voice sensor (e.g., a microphone), a battery gauge, and an environment sensor (e.g., a hygrometer, a thermometer, and the like).

The controller 180 may check a state of the display device 100 based on information collected by the sensing unit 120, and when a problem occurs, the controller 180 may notify the user of the problem or may make adjustments on its own to control the display device 100 to maintain the best state.

In addition, a content, an image quality, a size, and the like of the image provided by the display module 150 may be controlled differently based on a viewer sensed by the sensing unit, a surrounding illumination, or the like to provide an optimal viewing environment. As a smart TV progresses, the number of functions of the display device increases and the number of sensing units 20 also increases together.

The input unit 130 may be disposed at one side of a main body of the display device 100. For example, the input unit 130 may include a touch pad, a physical button, and the like. The input unit 130 may receive various user commands related to an operation of the display device 100 and transmit a control signal corresponding to the input command to the controller 180.

Recently, as a size of a bezel of the display device 100 decreases, the number of display devices 100 in a form in which the input unit 130 in a form of a physical button exposed to the outside is minimized is increasing. Instead, the minimized physical button may be located on a rear surface or a side surface of the display device 100, and a user input may be received from a remote control device 200 via the touch pad or the user input interface 173 to be described later.

The storage 140 may store programs for processing and controlling each signal in the controller 180, or may store signal-processed image, audio, or data signals. For example, the storage 140 may store application programs designed for the purpose of performing various tasks processable by the controller 180 and may selectively provide some of the stored application programs upon request from the controller 180.

The programs stored in the storage 140 are not particularly limited as long as they may be executed by the controller 180. The storage 140 may also perform a function for temporarily storing the image, audio, or data signals received from an external device via the external device interface 171. The storage 140 may store information on a predetermined broadcast channel via the channel memory function such as a channel map.

FIG. 1 shows an embodiment in which the storage 140 is disposed separately from the controller 180, but the scope of the present disclosure is not limited thereto, and the storage 140 is able to be included in the controller 180.

The storage 140 may include at least one of a volatile memory (e.g., a DRAM, a SRAM, a SDRAM, and the like) or a non-volatile memory (e.g., a flash memory, a hard disk drive (HDD), a solid-state drive (SSD), and the like).

The display module 150 may generate a driving signal by converting the image signal, the data signal, an OSD signal, and a control signal processed by the controller 180 or the image signal, the data signal, a control signal, and the like received from the interface 171. The display module 150 may include the display panel 11 having the plurality of pixels.

The plurality of pixels disposed on the display panel may include RGB sub-pixels. Alternatively, the plurality of pixels disposed on the display panel may include RGBW sub-pixels. The display module 150 may generate driving signals for the plurality of pixels by converting the image signal, the data signal, the OSD signal, the control signal, and the like processed by the controller 180.

The display module 150 may be a plasma display panel (PDP), a liquid crystal display (LCD), an organic light emitting diode (OLED), a flexible display module, and the like, or may be a three-dimensional (3D) display module. The 3D display module 150 may be classified into a non-glasses type and a glasses type.

The display device 100 includes the display module that occupies most of the front surface thereof and a casing that covers a rear surface, a side surface, and the like of the display module and packages the display module.

Recently, the display device 100 may use the display module 150 that may be bent such as the light emitting diode (LED) or the organic light emitting diode (OLED) to realize a curved screen in addition to a flat screen.

The LCD, which was mainly used in the past, received light via a backlight unit because it was difficult for the LCD to emit light on its own. The backlight unit is a device that uniformly supplies light supplied from a light source to a liquid crystal located in the front. As the backlight unit became thinner, it was possible to realize a thin LCD, but it was difficult to implement the backlight unit with a flexible material, and when the backlight unit is bent, it was difficult to uniformly supply the light to the liquid crystal, resulting in a change in brightness of the screen.

On the other hand, the LED or the OLED may be implemented to be bendable because each element constituting the pixel emits light on its own and thus the backlight unit is not used. In addition, because each element emits light on its own, even when a positional relationship with a neighboring element changes, brightness thereof is not affected, so that the display module 150 that is bendable using the LED or the OLED may be implemented.

The organic light emitting diode (OLED) panel appeared in earnest in mid-2010 and is rapidly replacing the LCD in a small and medium-sized display market. The OLED is a display made using a self-luminous phenomenon of emitting light when current flows through a fluorescent organic compound. The OLED has a higher image quality response speed than the LCD, so that there is almost no afterimage when realizing a moving image.

The OLED is a light-emitting display product that uses three types (red, green, and blue) of phosphor organic compounds having a self-luminous function, and uses a phenomenon in which electrons and positively charged particles injected from a cathode and an anode are combined with each other within an organic material to emit light by itself, so that there is no need for a backlight (a backlight device) that deteriorates color.

The light emitting diode (LED) panel, as a technology that uses one LED element as one pixel, may reduce a size of the LED element compared to the prior art, and thus, may implement the display module 150 that is bendable. A device referred to as an LED TV in the past only used the LED as the light source for the backlight unit that supplies the light to the LCD, and the LED itself was not able to constitute the screen.

The display module includes the display panel, and a coupling magnet, a first power supply, and a first signal module positioned on a rear surface of the display panel. The display panel may include a plurality of pixels R, G, and B. The plurality of pixels R, G, and B may be formed in respective areas where multiple data lines and multiple gate lines intersect each other. The plurality of pixels R, G, and B may be disposed or arranged in a matrix form.

For example, the plurality of pixels R, G, and B may include a red (hereinafter, 'R') sub-pixel, a green ('G') sub-pixel, and a blue ('B') sub-pixel. The plurality of pixels R, G, and B may further include a white (hereinafter, 'W') sub-pixel.

In the display module 150, a side on which the image is displayed may be referred to as a front side or a front surface. When the display module 150 displays the image, a side on which the image is not able to be observed may be referred to as a rear side or a rear surface.

In one example, the display module 150 may be constructed as the touch screen and may be used as the input device in addition to the output device.

The audio output unit 160 receives an audio-processed signal from the controller 180 and outputs the received signal as the audio.

An interface 170 serves as a passage for various types of external devices connected to the display device 100. The interface may be in a wireless scheme using the antenna as well as a wired scheme of transmitting and receiving data via the cable.

The interface 170 may include at least one of a wired/wireless headset port, an external charger port, a wired/wireless data port, a memory card port, a port for connecting a device having an identification module, an audio input/output (I/O) port, a video input/output (I/O) port, and an earphone port.

An example of the wireless scheme may include the broadcast receiver 1210 described above, and may include not only the broadcast signal, but also a mobile communication signal, a short-distance communication signal, a wireless Internet signal, and the like.

The external device interface 171 may transmit or receive data with a connected external device. To this end, the external device interface 171 may include an A/V input/output unit (not shown).

The external device interface 171 may be connected to the external device such as a digital versatile disk (DVD), a Blu-ray, a game console, a camera, a camcorder, a computer (a laptop), a set-top box, and the like in a wired/wireless manner, and may perform input/output operations with the external device.

In addition, the external device interface 171 may establish a communication network with various remote control devices 200 to receive a control signal related to the operation of the display device 100 from the remote control device 200 or to transmit data related to the operation of the display device 100 to the remote control device 200.

The external device interface 171 may include a wireless communication unit (not shown) for short-range wireless communication with other electronic devices. With such a wireless communication unit (not shown), the external device interface 171 may exchange data with an adjacent mobile terminal. In particular, the external device interface 171 may receive device information, running application information, an application image, and the like from the mobile terminal in a mirroring mode.

The network interface 172 may provide an interface for connecting the display device 100 to a wired/wireless network including an Internet network. For example, the network interface 172 may receive content or data provided by the Internet, a content provider, or a network operator via the network. In one example, the network interface 172 may include a communication module (not shown) for connection to the wired/wireless network.

The external device interface 171 and/or the network interface 172 may include a communication module for the short-range communication such as a wireless fidelity (Wi-Fi), a Bluetooth, a Bluetooth low energy (BLE), a Zigbee, and a near field communication (NFC), a communication module for cellular communication such as a long-term evolution (LTE), an LTE advance (LTE-A), a code division multiple access (CDMA), a wideband CDMA (WCDMA), a universal mobile telecommunications system (UMTS), and a wireless broadband (WiBro), and the like.

The user input interface 173 may transmit a signal input by the user to the controller 180 or transmit a signal from the controller 180 to the user. For example, a user input signal such as power ON/OFF, channel selection, screen setting, and the like may be transmitted/received to/from the remote control device 200, a user input signal input from a local key (not shown) such as a power key, a channel key, a volume key, a setting value, and the like may be transmitted to the controller 180, a user input signal input from a sensor unit (not shown) that senses a gesture of the user may be transmitted to the controller 180, or a signal from the controller 180 may be transmitted to the sensor unit.

The controller 180 may include at least one processor and may control overall operations of the display device 100 using the processor included therein. In this regard, the processor may be a general processor such as a central processing unit (CPU). In one example, the processor may be a dedicated device such as an ASIC or a processor based on other hardware.

The controller 180 may demultiplex the stream input via the tuner 1211, the demodulator 1212, the external device interface 171, or the network interface 172, or process a demultiplexed signal to generate or output a signal for image or audio output.

The image signal image-processed by the controller 180 may be input to the display module 150 and displayed as an image corresponding to the corresponding image signal. In addition, the image signal image-processed by the controller 180 may be input to an external output device via the external device interface 171.

The audio signal processed by the controller 180 may be output as the audio via the audio output unit 160. In addition, the audio signal processed by the controller 180 may be input to the external output device via the external device interface 171. In addition, the controller 180 may include a demultiplexer, an image processor, and the like.

In addition, the controller 180 may control overall operations within the display device 100. For example, the controller 180 may control the tuner 1211 to select (tune) a broadcast corresponding to the channel selected by the user or the pre-stored channel.

In addition, the controller 180 may control the display device 100 in response to a user command input via the user input interface 173 or by an internal program. In one example, the controller 180 may control the display module 150 to display the image. In this regard, the image displayed on the display module 150 may be a still image or a moving image and may be a 2D image or a 3D image.

In one example, the controller 180 may allow a predetermined 2D object to be displayed within the image displayed on the display module 150. For example, the object may be at least one of a connected web screen (a newspaper, a magazine, and the like), an electronic program guide (EPG), various menus, a widget, an icon, the still image, the moving image, and a text.

In one example, the controller 180 may modulate and/or demodulate a signal using an amplitude shift keying (ASK) scheme. Here, the amplitude shift keying (ASK) scheme may refer to a scheme of modulating the signal by varying an amplitude of a carrier wave based on a data value or restoring an analog signal to a digital data value based on to the amplitude of the carrier wave.

For example, the controller 180 may modulate the image signal using the amplitude shift keying (ASK) scheme and transmit the modulated image signal via a wireless communication module.

For example, the controller 180 may demodulate and process the image signal received via the wireless communication module using the amplitude shift keying (ASK) scheme.

Therefore, the display device 100 may easily transmit and receive a signal with another image display device disposed adjacent thereto without using a unique identifier such as a media access control address (MAC address) or a complex communication protocol such as TCP/IP.

In one example, the display device 100 may further include a photographing unit (not shown). The photographing unit may photograph the user. The photographing unit may be implemented with one camera, but may not be limited thereto, and may be implemented with a plurality of cameras. In one example, the photographing unit may be embedded in the display device 100 or disposed separately upwardly of the display module 150. Information on the image photographed by the photographing unit may be input to the controller 180.

The controller 180 may recognize a location of the user based on the image photographed by the photographing unit. For example, the controller 180 may identify a distance between the user and the display device 100 (a z-axis coordinate). In addition, the controller 180 may determine an x-axis coordinate and a y-axis coordinate within the display module 150 corresponding to the location of the user.

The controller 180 may sense the gesture of the user based on the image photographed by the photographing unit or the signal sensed by the sensor unit, or a combination thereof.

The power supply 190 may supply the corresponding power throughout the display device 100. In particular, the power may be supplied to the controller 180 that may be implemented in a form of a system on chip (SOC), the display module 150 for displaying the image, the audio output unit 160 for outputting the audio, and the like.

Specifically, the power supply 190 may include a converter (not shown) that converts AC power to DC power and a Dc/Dc converter (not shown) that converts a level of the DC power.

In one example, the power supply 190 serves to receive the power from the outside and distribute the power to each component. The power supply 190 may use a scheme of supplying the AC power in direct connection to an external power source and may include a power supply 190 that may be charged and used by including a battery.

In a case of the former, the power supply is used in connection with the cable and has difficulties in moving or is limited in a movement range. In a case of the latter, the movement is free, but a weight and a volume of the power supply increase as much as those of the battery, and the power supply must be directly connected to a power cable for a certain period of time for charging or coupled to a charging cradle (not shown) that supplies the power.

The charging cradle may be connected to the display device via a terminal exposed to the outside, or the built-in battery may be charged using a wireless scheme when approaching the charging cradle.

The remote control device 200 may transmit the user input to the user input interface 173. To this end, the remote control device 200 may use the Bluetooth, a radio frequency (RF) communication, an infrared radiation (IR) communication, an ultra-wideband (UWB), the ZigBee, or the like. In addition, the remote control device 200 may receive the image, audio, or data signal output from the user input interface 173 and display the same thereon or output the same as audio.

In one example, the display device 100 described above may be a fixed or mobile digital broadcast receiver that may receive a digital broadcast.

The block diagram of the display device 100 shown in FIG. 1 is only a block diagram for one embodiment of the present disclosure, and each component of the block diagram is able to be integrated, added, or omitted based on specifications of the display device 100 that is actually implemented.

That is, when necessary, two or more components may be combined to each other into one component, or one component may be subdivided into two or more components. In addition, functions performed in each block are for illustrating the embodiment of the present disclosure, and a specific operation or a device thereof does not limit the scope of rights of the present disclosure.

Figure 2:
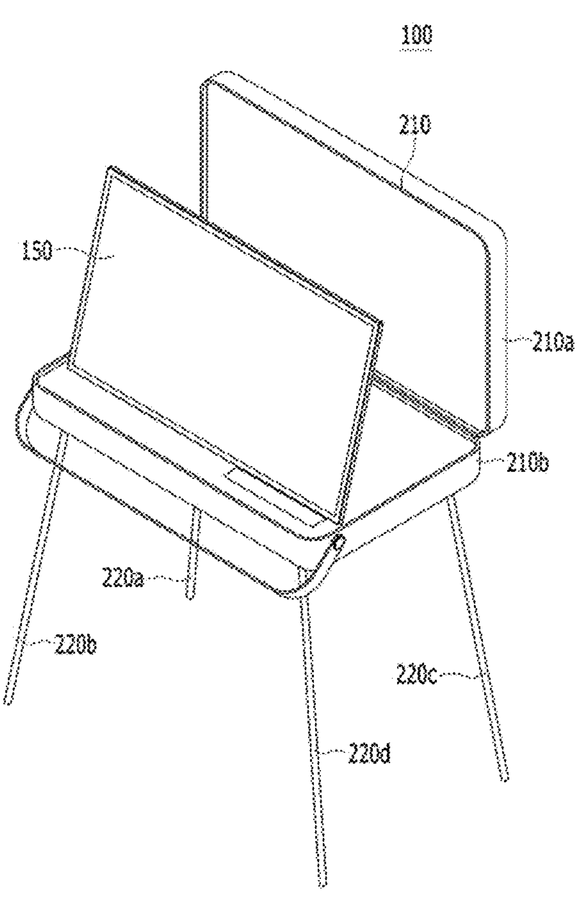
FIG. 2 is a diagram illustrating a display device according to an embodiment of the present disclosure.

FIG. 2 is a diagram showing a display device according to an embodiment of the present disclosure. Hereinafter, redundant descriptions duplicate with the above descriptions will be omitted.

Referring to FIG. 2, the display device 100 has the display module 150 accommodated inside a housing 210. In this regard, the housing 210 may include an upper casing 210*a* and a lower casing 210*b*, and the upper casing 210*a* and the lower casing 210*b* may have a structure of being opened and closed.

In one embodiment, the audio output unit 160 may be included in the upper casing 210*a* of the display device **100*, and the main board that is the controller 180, a power board, the power supply 190, the battery, the interface 170, the sensing unit 120, and the input unit (including the local key) 130 may be accommodated in the lower casing 210*b*. In this regard, the interface 170 may include a Wi-Fi module, a Bluetooth module, an NFC module, and the like for the communication with the external device, and the sensing unit 120 may include an illuminance sensor and an IR sensor.

In one embodiment, the display module 150 may include a DC-DC board, a sensor, and a low voltage differential signaling (LVDS) conversion board.

In addition, in one embodiment, the display device 100 may further include four detachable legs 220*a*, 220*b*, 220*c*, and 220*d*. In this regard, the four legs 220*a*, 220*b*, 220*c*, and 220*d* may be attached to the lower casing 210*b* to space the display device 100 from the floor.

The display device shown in FIG. 2 is an illustrative example. Display devices to which the present disclosure is applicable include not only display devices with new form factors but also display devices with existing form factors including conventional flat-screen TVs.

Hereinafter, the proposed technology will be described with reference to FIGS. 3 to 7.

Figure 3:
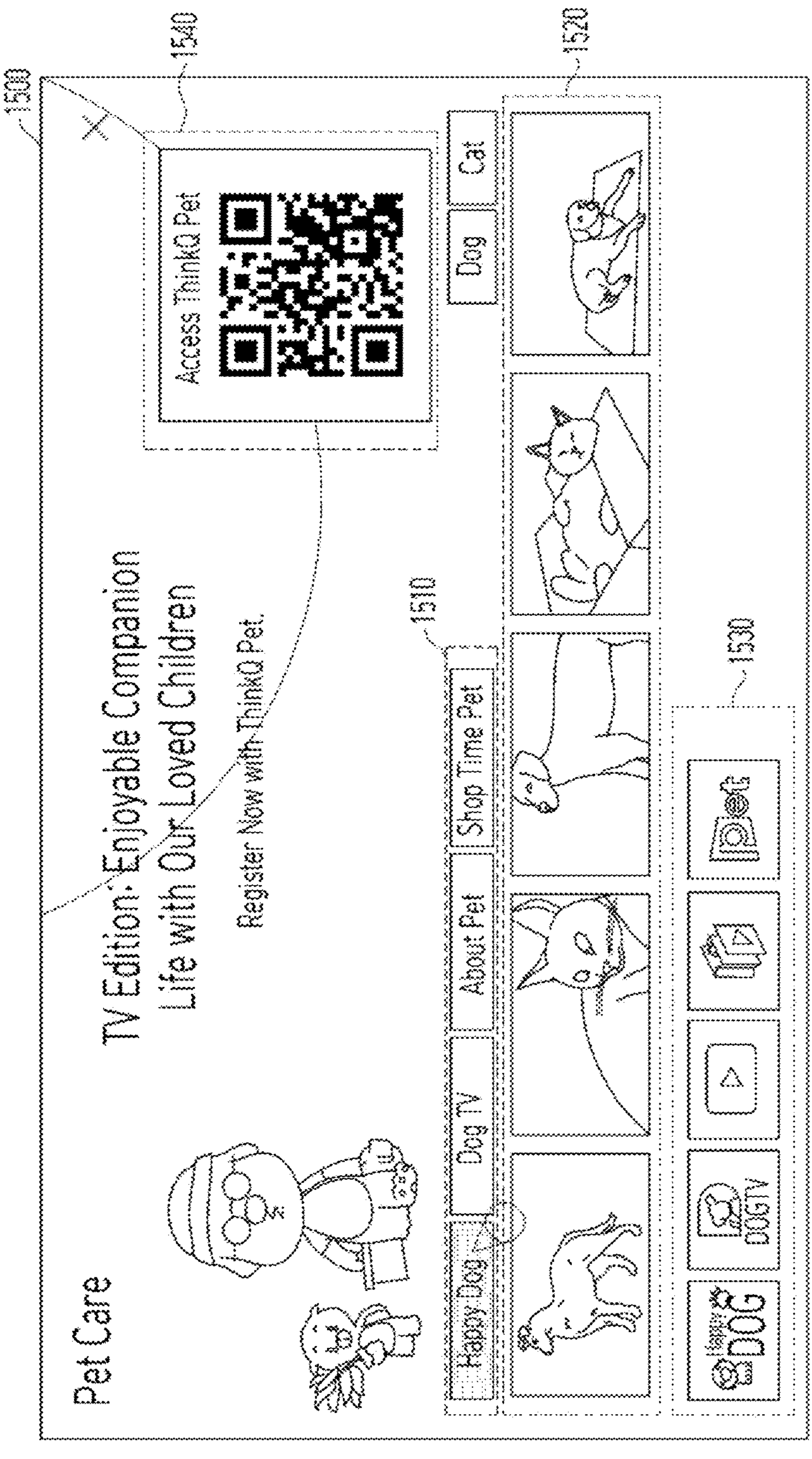
FIG. 3 illustrates an exemplary user interface 1500 for a pet care mode displayed on a display according to the present disclosure.

FIG. 3 illustrates an exemplary user interface 1500 for a companion animal (hereinafter referred to as "pet") care mode displayed on the display according to the present disclosure.

The user interface 1500 for the pet care mode may include default menus 1510, thumbnails of content for specific menus 1520, related application list icons 1530, and a related mobile application access code 1540.

In this specification, the term "pet care mode" refers to an operation mode of the multimedia device 100 designed for managing and protecting pets. The pet care mode may be displayed on the display 150 as the user interface 1500. The pet care mode is designed to provide content for pets, provide and/or record information on the conditions of pets, and provide and/or record information on the health/grooming management for pets.

FIG. 4 illustrates another exemplary user interface 1500 for the pet care mode displayed on the display according to the present disclosure.

The user interface 1500 for the pet care mode may include default menus 1510, thumbnails of content for specific menus 1520, related application list icons 1530, and information on the conditions of registered pets 1540.

Figure 5:
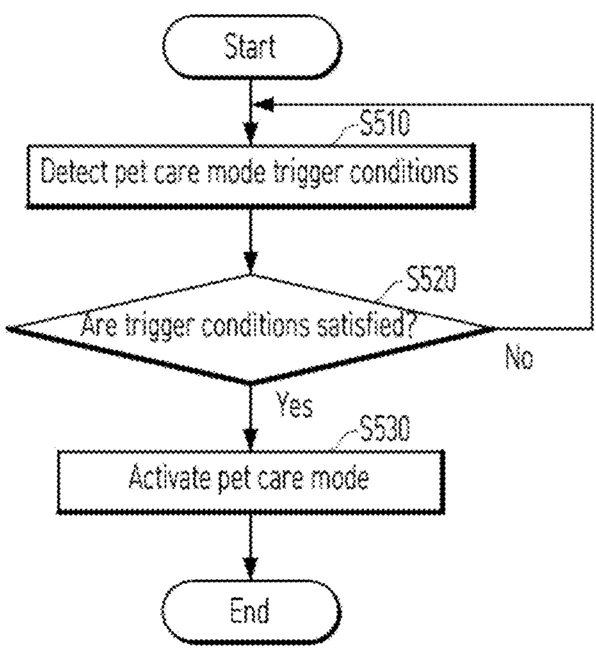
FIG. 5 illustrates a flowchart of a control method for a multimedia device for the pet care mode according to the present disclosure.

FIG. 5 illustrates a flowchart of a control method for the multimedia device for the pet care mode according to the present disclosure. The control method of FIG. 5 may be performed by the multimedia device 100 or the controller 180 of the multimedia device 100. Alternatively, the control method may be performed by other components of the multimedia device 100. Hereinafter, for the sake of simplicity in the explanation, it is assumed that the control method is performed by the multimedia device 100.

The multimedia device 100 may detect trigger conditions for the pet care mode (S510). The trigger conditions for the pet care mode may be configured in various ways, one of which may be detection of the absence of users in the living space. When the multimedia device 100 is located in a specific space (e.g., a living room in a home), if it is determined that no users are present in the space, the pet care mode may be activated.

The detection of the user's absence may be carried out in various ways. That is, the scope of the rights of the present disclosure is not limited thereto. As an example, the user's absence may be detected through object detection within a video feed from the camera in the sensing unit 120 of the multimedia device 100. As another example, the user's absence may be detected through object detection using external sensors connected to the multimedia device 100. In this case, the multimedia device 100 may receive sensing data from the external sensors and detect the user's absence based on the sensing data.

Additionally, the trigger conditions for the pet care mode may include the detection of a direct activation command from the user or an equivalent entity. When the user is about to leave, the user may input a command to activate the pet care mode into the multimedia device 100.

As described above, the trigger conditions for the pet care mode are diverse. The trigger conditions may be stored in the storage 140 (referred to hereinafter as "memory") of the multimedia device 100. When the corresponding trigger conditions are satisfied, the multimedia device 100 may activate the pet care mode.

Table 1 below shows pet mode trigger conditions stored in the memory 140 of the multimedia device 100. Pet mode trigger conditions may be configured by combining two or more conditions as shown in No. 4 to 7 of Table 1. In addition to the pet mode trigger conditions listed in Table 1, other trigger conditions may also be used.

TABLE 1

| No. | Pet Mode Trigger Conditions | Detailed Information |
|---|---|---|
| 1 | A | Detection of user's absence (or detection of user's departure) |
| 2 | B | When pet's crying sounds or barking behavior exceeds prescribed level |
| 3 | C | User's input for pet mode activation |
| 4 | A + B | |
| 5 | A + C | Although user's input for pet mode activation is provided, pet mode is triggered only if condition A is satisfied |
| 6 | B + C | Although user's input for pet mode activation is provided, pet mode is triggered only if condition B is satisfied |
| 7 | A + B + C | Although user's input for pet mode activation is provided, pet mode is triggered only if both conditions A and B are satisfied |

The multimedia device 100 detects or determines whether the trigger conditions for the pet care mode are satisfied (S520). If the trigger conditions for the pet care mode are satisfied, the multimedia device 100 activates the pet care mode (S530).

The activation of the pet care mode involves displaying the user interface 1500 on the display 150. In other words, once the pet care mode is activated, the multimedia device 100 controls the display 150 to display the user interface 1500 based on the pet care mode.

In addition, the image quality or resolution of the display 150 may vary depending on which trigger condition for the pet care mode is satisfied. In other words, the multimedia device 100 may control the image quality, resolution, or color of the display 150 exclusively for the pet care mode.

Such configurations may be stored in the memory 140 of the multimedia device 100. The multimedia device 100 may select an image quality or resolution configuration based on the detected trigger condition and control the output on the display 150 based on the selected image quality or resolution configuration.

Table 2 below shows image quality or resolution configurations displayed on the display 150 based on the pet mode trigger conditions stored in the memory 140 of the multimedia device 100. The image quality or resolution configurations may be referred to as display modes.

Pet mode trigger conditions may be configured by combining two or more conditions as shown in No. 4 to 7 of Table 2. In addition to the pet mode trigger conditions listed in Table 2, other trigger conditions or other image quality and resolution configurations may also be used.

TABLE 2

| No. | Pet Mode Trigger Conditions | Display Modes Displayed on Display 150 |
|---|---|---|
| 1 | A | Display Mode 1 |
| 2 | B | Display Mode 2 |
| 3 | C | Display Mode 3 |
| 4 | A + B | Display Mode 1 or 2 |
| 5 | A + C | Display Mode 1 |
| 6 | B + C | Display Mode 2 |
| 7 | A + B + C | Display Mode 1 or 2 |

For example, display mode 1 may refer to a mode that reduces the resolution of the display 150 to half of the maximum resolution of the display 150 (i.e., resolution control mode). Display mode 2 may refer to a mode that applies a boost to the red and green colors for displaying (i.e., color control mode). Display mode 3 may refer to a mode that controls the resolution and color adjustment configuration of the display 150 based on user presets.

Moreover, the content in the user interface 1500 displayed on the display 150 may vary depending on which trigger condition for the pet care mode is satisfied. The content in the user interface 1500 or a set of content therein may be referred to as a user interface mode. Such configurations may be stored in the memory 140 of the multimedia device 100. The multimedia device 100 may select a user interface mode based on the detected trigger condition and control the output on the display 150 based on the selected user interface mode.

Table 3 below shows user interface modes displayed on the display 150 based on the pet mode trigger conditions stored in the memory 140 of the multimedia device 100. Pet mode trigger conditions may be configured by combining two or more conditions as shown in No. 4 to 7 of Table 3. In addition to the pet mode trigger conditions listed in Table 3, other trigger conditions or other user interface modes may also be used.

TABLE 3

| No. | Pet Mode Trigger Conditions | User Interface Modes Displayed on Display 150 |
|---|---|---|
| 1 | A | User Interface Mode 1 |
| 2 | B | User Interface Mode 2 |
| 3 | C | User Interface Mode 3 |
| 4 | A + B | User Interface Mode 1 or 2 |
| 5 | A + C | User Interface Mode 1 |
| 6 | B + C | User Interface Mode 2 |
| 7 | A + B + C | User Interface Mode 1 or 2 |

For example, user interface mode 1 may correspond to the user interface 1500 shown in FIG. 4, and user interface mode 2 may correspond to the user interface 1500 shown in FIG. 3. In addition, user interface mode 3 may correspond to a user interface 1500 that represents other pet-related content or a set thereof.

When the pet care mode is activated, pet images detected through the camera of the sensing unit 120 may be used as control commands (or instructions) for the selected and displayed user interface 1500. Thus, it is expected that the above operation will provide content or services suitable for the pet's pose or behavior. For example, if it is detected that the pet is lying on the floor, the multimedia device may control to output static video content or calm music.

In addition, when the pet care mode is activated, the multimedia device 100 may configure default search keywords, which correspond to search terms for selected and displayed search services provided by the user interface 1500. The configured default search keywords may be configured to always be included during keyword-based searches. For example, "dog" may be included as a default search keyword. If a search command is input by the user or an equivalent entity, the multimedia device 100 may perform a search by including the default search keyword "dog" in addition to any separately input search terms.

The detected pet images may be used not only as the commands (or instructions) for the user interface 1500 but also as commands (or instructions) or control inputs for content control. For example, the detected pet images may be used for playing, pausing, or replacing the content displayed on the display 150 or user interface 1500.

To this end, the multimedia device 100 may analyze the pet's behavior patterns from the detected pet images or obtain analysis information on the pet's behavior patterns based on the detected pet images. The multimedia device 100 may assess the pet's emotions or intentions through the pet's behavior patterns and control the content displayed on the display 150 or user interface 1500 based on the assessment.

The multimedia device 100 may obtain the level of risk by analyzing the detected pet images. In this case, if the acquired risk level exceeds a predetermined threshold, the multimedia device 100 may control the display 150 to display warning content. The warning content is designed to capture the pet's attention. That is, the warning content is intended to encourage the pet that was engaging in risky behavior to stop the risky behavior and watch the content displayed on the display 150 of the multimedia device 100.

Moreover, when the pet care mode is activated, the multimedia device 100 may control sound output in relation to the user interface 1500 by limiting or adjusting the sound within the audible range of the pet. In other words, the multimedia device 100 may control the frequency configuration of the audio output unit 160 exclusively for the pet care mode.

FIG. 6 is a flowchart for explaining interaction between the multimedia device 100 for the pet care mode and another device or machine according to the present disclosure.

For the pet care mode, the multimedia device 100 may interact with the other device or machine.

When the pet care mode is activated (S600), the multimedia device 100 may transmit a message informing the activation of the pet care mode to the other device or machine (S610). Upon receiving the message informing the activation of the pet care mode, the other device or machine may activate an operation mode for the pet care mode and operate in the activated mode (S620). For example, the operation mode for the pet care mode may include predetermined operations.

For example, the multimedia device 100 may interact with a cleaner or an air purifier. When the pet care mode is activated, the multimedia device 100 may transmit the message informing the activation of the pet care mode to the cleaner or air purifier. Upon receiving the message, the cleaner or air purifier may operate as follows: the cleaner may activate an operation mode only for pet care such as starting cleaning; or the air purifier may activate an operation mode only for pet care such as controlling ON/OFF, airflow, etc.

Additionally, when the pet care mode is activated, the multimedia device 100 may interact with two or more other devices or machines. When the pet care mode is activated, the multimedia device 100 may transmit the message informing the activation of the pet care mode to other devices or machines (S680). The other devices or machines may activate an operation mode for the pet care mode and operate in the activated mode (S690). For example, the operation mode for the pet care mode may include predetermined operations. The sequence of transmission and reception of the message informing the activation of the pet care mode (S610 and S680) and the sequence of operational control based on the pet care mode (S620 and S690) are merely examples, and the sequences may not necessarily align with those illustrated in FIG. 6.

Additionally, when the pet care mode is activated, the interaction with other devices or machines may be patterned. That is, the interaction may include sequentially controlling the operations of a plurality of devices or machines. For example, when the pet care mode is activated, the multimedia device 100 may control the cleaner to initiate the cleaning operation. After the cleaning operation is completed, the multimedia device 100 may control the operation of the air purifier.

The cleaner and air purifier are merely examples. That is, multimedia device 100 may also interact with, for example, a feeder or a water dispenser for pets and control the operation of the feeder or water dispenser when the pet care mode is activated.

Figure 7:
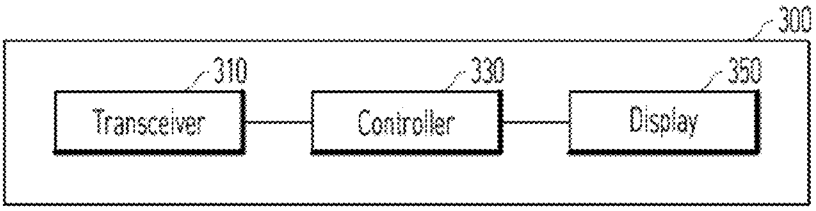
FIG. 7 illustrates a block diagram of a device according to the present disclosure.

FIG. 7 illustrates a block diagram of a device or machine 300 that interacts with the multimedia device 100 according to the present disclosure.

The device 300 may include: a transceiver 310 for receiving the message informing the activation of the pet care mode from the multimedia device 100; and a controller 330 for controlling the transceiver or controlling operations of the device 300. Additionally, the device 300 may include a display 350 for displaying the receipt of the message informing the activation of the pet care mode or displaying information related to the operations of the device 300.

The message informing the activation of the pet care mode may include information on the pet mode trigger conditions, information on the display modes displayed on the display 150, or information on the user interface modes displayed on the display 150, which are described above in Tables 1 to 3. The device 300 may control the operations of the device 300 based on information on at least one of a received pet mode trigger condition, a received display mode, or a received user interface mode.

In another aspect of the present disclosure, the above-described proposals or operations may be provided as code that is capable of being implemented, performed, or executed by computers (herein, the computer is a comprehensive concept including a system on chip (SoC), a processor, a microprocessor etc.) or a computer-readable storage medium or computer program product storing or including the code. The scope of the present disclosure may be extended to the code or the computer-readable storage medium or computer program product storing or including the code.

The preferred embodiments of the present disclosure are provided to allow those skilled in the art to implement and embody the present disclosure. While the present disclosure has been described and illustrated herein with reference to the preferred embodiments thereof, it is understood to those skilled in the art that various modifications and variations could be made therein without departing from the scope of the disclosure. Therefore, the present disclosure is not limited to the embodiments disclosed herein but intends to give the broadest scope consistent with the new principles and features disclosed herein.

What is claimed is:

1. A multimedia device comprising:

a display configured to display a user interface based on a pet care mode; and a controller configured to control the display, wherein the controller is configured to:

detect whether trigger conditions are satisfied, wherein the trigger conditions include selection by a user or absence of the user;

activate the pet care mode based on satisfaction of the trigger conditions;

detect an image of a pet through a camera; and use the detected image as a command for controlling the multimedia device, wherein controlling the multimedia device comprises:

control the display to adjust resolution or color of the display, or change contents displayed in the user interface, wherein based on the activation of the pet care mode, the controller is configured to:

receive a search text input by a user via the displayed user interface for a search service;

set a default search keyword for the search service provided in the user interface based on the pet care mode, add the default search keyword to the search text input by the user via the displayed user interface; and perform a search for the search service using the search text input by the user and the added default search keyword.

2. The multimedia device of claim 1, wherein after the activation of the pet care mode, the controller is configured to control the display to display the user interface in accordance with the pet care mode.

3. The multimedia device of claim 1, wherein the controller is configured to vary content in the user interface or an image quality of the display depending on the satisfied trigger conditions.

4. The multimedia device of claim 1, wherein based on the activation of the pet care mode, the controller is configured to:

control a resolution or color of the display exclusively for the pet care mode; and control a frequency configuration of a speaker exclusively for the pet care mode.

5. The multimedia device of claim 1, wherein the controller is configured to:

control playing content displayed on the display, pausing the content displayed on the display, or replacing the content displayed on the display with different content, depending on responses of the pet based on the detected image.

6. The multimedia device of claim 1, wherein based on that a risk level of a pet based on an image of the pet detected through a camera exceeds a predetermined value, the controller is configured to control the display to display risk avoidance content to the display.

7. A method of controlling a multimedia device, the method performed by a multimedia device comprising:

a display configured to display a user interface based on a pet care mode; and a controller configured to control the display, wherein the method comprises:

detecting whether trigger conditions are satisfied, wherein the trigger conditions include selection by a user or absence of the user;

activating the pet care mode based on satisfaction of the trigger conditions;

detecting an image of a pet through a camera; and using the detected image as a command for controlling the multimedia device, wherein controlling the multimedia device comprises:

controlling the display to adjust resolution or color of the display, or change contents displayed in the user interface, wherein based on the activation of the pet care mode, the controller is configured to:

receive a search text input by a user via the displayed user interface for a search service;

set a default search keyword for the search service provided in the user interface based on the pet care mode, add the default search keyword to the search text input by the user via the displayed user interface; and perform a search for the search service using the search text input by the user and the added default search keyword.

8. The method of claim 7, comprising controlling the display to display the user interface in accordance with the pet care mode after the activation of the pet care mode.

9. The method of claim 7, comprising varying content in the user interface or an image quality of the display depending on the satisfied trigger conditions.

10. The method of claim 7, comprising, based on the activation of the pet care mode:

controlling a resolution or color of the display exclusively for the pet care mode; and controlling a frequency configuration of a speaker exclusively for the pet care mode.

11. The method of claim 7, comprising:

controlling playing content displayed on the display, pausing the content displayed on the display, or replacing the content displayed on the display with different content, depending on responses of the pet in accordance with the detected image.

12. The method of claim 7, comprising:

wherein based on that a risk level of a pet based on an image of the pet detected through a camera exceeds a predetermined value, controlling the display to display risk avoidance content to the display.

* * * * *